(12) United States Patent
Ivtsenkov et al.

(10) Patent No.: US 9,086,472 B2
(45) Date of Patent: Jul. 21, 2015

(54) MULTI-TRANSCEIVER RF ALERT SYSTEM FOR PREVENTING HUNTING ACCIDENTS

(71) Applicants: Gennadii Ivtsenkov, Hamilton, CA (US); Evgeny Berik, Tartu (EE)

(72) Inventors: Gennadii Ivtsenkov, Hamilton, CA (US); Evgeny Berik, Tartu (EE)

(*) Notice: Subject to any disclaimer, the term of this patent is extended or adjusted under 35 U.S.C. 154(b) by 266 days.

(21) Appl. No.: 13/626,995

(22) Filed: Sep. 26, 2012

(65) Prior Publication Data

US 2014/0085125 A1 Mar. 27, 2014

(51) Int. Cl.
| | |
|---|---|
| G01S 13/78 | (2006.01) |
| G01S 3/30 | (2006.01) |
| G01S 13/76 | (2006.01) |
| G01S 13/87 | (2006.01) |
| G01S 13/88 | (2006.01) |

(52) U.S. Cl.
CPC .............. G01S 3/30 (2013.01); G01S 13/765 (2013.01); G01S 13/78 (2013.01); G01S 13/87 (2013.01); G01S 13/88 (2013.01)

(58) Field of Classification Search
CPC ............. G01S 1/00; G01S 1/02; G01S 1/024; G01S 1/042; G01S 1/045; G01S 1/047; G01S 1/08; G01S 1/68; G01S 13/00; G01S 13/74; G01S 13/765; G01S 13/767; G01S 13/78; G01S 13/88; G01S 13/886; G01S 13/887; G01S 13/888; G01S 13/93; G01S 13/931; G01S 15/00; G01S 15/74; G01S 2015/00; G01S 3/30; G01S 13/87; H04B 1/00; H04B 1/005; H04B 1/0053; H04B 1/0057; H04B 1/0067; H04B 1/0071; H04B 1/02; H04B 1/0343; H04B 1/0346; H04B 1/06; H04B 1/086; H04B 1/10; H04B 1/1615; H04B 1/38; H04B 1/3827; H04B 1/3833; H04B 1/385; H04B 1/50
USPC .......................................................... 342/45
See application file for complete search history.

(56) References Cited

U.S. PATENT DOCUMENTS

| | | | | |
|---|---|---|---|---|
| 3,691,559 | A * | 9/1972 | Jackson | 342/458 |
| 3,928,804 | A * | 12/1975 | Schmidt et al. | 370/323 |
| 3,993,997 | A * | 11/1976 | Jackson | 342/455 |
| 4,151,525 | A * | 4/1979 | Strauch et al. | 342/46 |
| 4,297,707 | A * | 10/1981 | Brunner et al. | 343/725 |
| H1606 | H * | 11/1996 | Gelnovatch et al. | 340/505 |
| 5,585,953 | A * | 12/1996 | Zavrel | 398/115 |
| 5,648,862 | A * | 7/1997 | Owen | 398/128 |
| 5,929,777 | A * | 7/1999 | Reynolds | 340/8.1 |
| 5,966,226 | A * | 10/1999 | Gerber | 398/108 |
| 6,140,982 | A * | 10/2000 | Fuchter et al. | 345/45 |
| 6,222,480 | B1 * | 4/2001 | Kuntman et al. | 342/30 |
| 6,313,783 | B1 * | 11/2001 | Kuntman et al. | 342/32 |
| 6,813,254 | B1 * | 11/2004 | Mujtaba | 370/335 |
| 6,945,187 | B1 * | 9/2005 | Woodall et al. | 114/256 |
| 6,958,677 | B1 * | 10/2005 | Carter | 340/10.1 |

(Continued)

*Primary Examiner* — John B Sotomayor

(57) ABSTRACT

The RF system for preventing hunting accidents comprising RF interrogator mounted on the firearm or hunter's hat and RF transponder attached to hunter's hat, wherein directional pattern of antennas of the hat-mounted interrogator is directed along the line of view of the hunter so matching with sightline of hunter's rifle; and RF transponder, which, to cover directional pattern of 360 arc degrees in azimuth, contains a number of RF transceiver evenly attached to the hunter's hat in horizontal plane and connected to the single electronic unit. The system provides alert information about "friendly targets" that could be under fire, such as other hunters or persons equipped with said transponder; and if they are, the system develops alert signal: "Do not shoot".

8 Claims, 5 Drawing Sheets

(56) References Cited

U.S. PATENT DOCUMENTS

Figure 1:
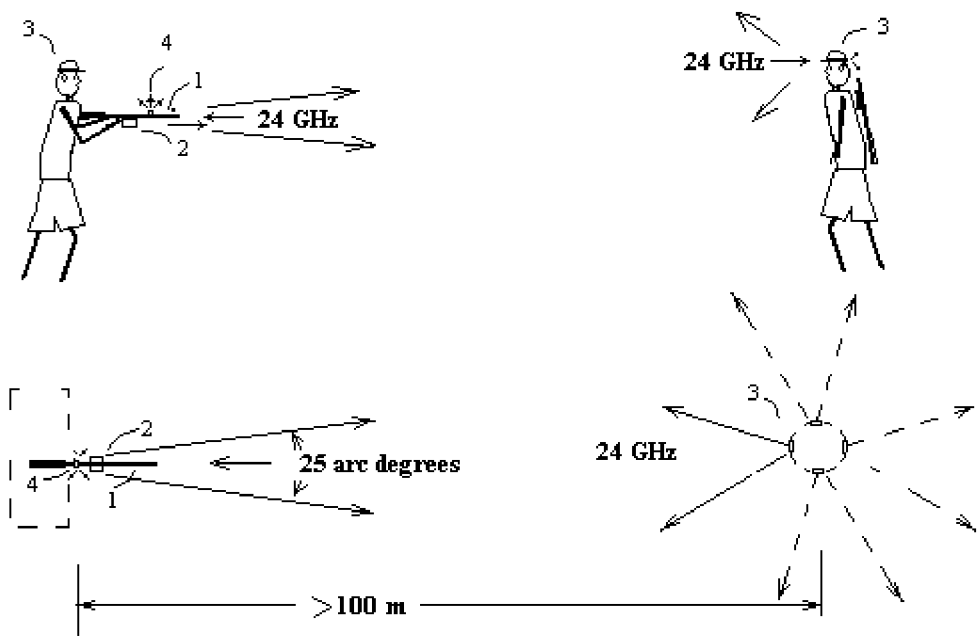

| | | | |
|---|---|---|---|
| 7,106,246 B1* | 9/2006 | Lindell | 342/51 |
| 7,308,202 B2* | 12/2007 | Roes et al. | 398/108 |
| 7,831,150 B2* | 11/2010 | Roes et al. | 398/130 |
| 8,842,015 B2* | 9/2014 | Scott | 340/600 |
| 2003/0193925 A1* | 10/2003 | Mujtaba | 370/347 |
| 2007/0021059 A1* | 1/2007 | Karabinis et al. | 455/12.1 |
| 2007/0236384 A1* | 10/2007 | Ivtsenkov et al. | 342/45 |
| 2008/0297324 A1* | 12/2008 | Tuttle | 340/10.33 |
| 2009/0045996 A1* | 2/2009 | Ivtsenkov et al. | 342/45 |
| 2009/0219141 A1* | 9/2009 | Pillai et al. | 340/10.2 |
| 2010/0289691 A1* | 11/2010 | Ivtsenkov et al. | 342/45 |
| 2011/0063102 A1* | 3/2011 | Ivtsenkov et al. | 340/505 |
| 2012/0073178 A1* | 3/2012 | Ivtsenkov et al. | 42/70.06 |
| 2013/0015977 A1* | 1/2013 | Scott | 340/600 |
| 2014/0085125 A1* | 3/2014 | Ivtsenkov et al. | 342/45 |

* cited by examiner

MULTI-TRANSCEIVER RF ALERT SYSTEM FOR PREVENTING HUNTING ACCIDENTS

CROSS-REFERENCE TO RELATED APPLICATIONS

This application is related to U.S. patent application Ser. No. 13/031,703, U.S. patent application Ser. No. 12/465,715, U.S. Pat. No 8,179,247 and Canadian Patent No 2,549,727 filed by the authors of the present invention.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATED-BY-REFERENCE OF MATERIAL SUBMITTED ON A COMPACT DISK

Not Applicable.

FIELD OF THE INVENTION

This invention relates generally to systems protecting a person from friendly fire, such as radio (RF) based combat identification (IFF) systems for ground targets and more particularly to systems preventing hunting accidents, which use RF signals emitted by an interrogator and received by transponder of a target (another hunter), which sends RF response alert signal to prevent an accidental fire.

DESCRIPTION OF THE RELATED ART

The present invention is related to U.S. patent application Ser. No. 13/031,703, U.S. patent application Ser. No. 12/465, 715, U.S. Pat. No. 8,179,247 and Canadian Patent No 2,549, 727 filed by the authors of the present invention; and it is dedicated to civil application, particularly for hunter protection.

The problem of protection a hunter of accidental fire still unsolved. Each year, an alarming number of wild game hunters are accidentally shot by other hunters due to mistaken identity, poor visibility, or mere carelessness. Despite of some measures implemented by Hunter Associations, such as bright orange color of hunter's coat and hat, tragic accidents still continuously occur, especially in the case when the sightline is obstructed and hunter start firing on sound, which, he believes, belongs to animal.

From another hand, it is the solution based on experience with military friend-or-foe (IFF) identification systems. Particularly, the Dismounted Armed Forces have an interest in the remote identification of a person as friend or foe, particularly to prevent friendly fire in armed conflicts. Combat identification devices that are known as friend or foe (IFF) systems are well known for decades for military aircraft. Such systems are based on RF transmission and very useful for preventing action against friendly aircrafts.

The military platform commanders target friend-or-foe identification presents a difficult decision for a military platform commander, who must decide whether to engage a detected target while avoiding accidental fratricide.

This problem is even more difficult for the dismounted soldier who may be moving covertly through an unknown combat zone at night in the conditions of limited visibility.

The combined optical—radio IFF system dedicated to dismounted soldier was introduced in U.S. patent application Ser. No. 11/685,682 filed by the authors of the present invention. It comprises two channels—optical infrared and Ka-band RF ones, wherein the sharp-diagram optical channel works in the condition of direct visibility, and RF channel having larger diagram (about 17 arc degrees at 24 GHz) gives to a shooter information about potential targets in the shooting area directed along the sightline.

For the system exclusively dedicated to prevent hunting accidents, mentioned IFF system can be utilized, but in simplified version containing directed sharp-diagram RF interrogating channel and wide-diagram responding channels only. Unlike optical signal, RF one passes through the objects, which are not transparent for optical signals, but RF interrogator has relatively wide angular diagram determined by RF signal frequency, antenna design and aperture.

There are some attempts to utilize RF and optical signal in hunter protecting systems. Two similar systems that, according to the author, can prevent hunting accidents, are described in U.S. Pat. No. 3,400,393 and US Patent Application No 20070205890. Here the authors propose RF system containing continuously-emitting RF beacon attached to a potential target and a sharp-diagram RF receiver mounted on hunter's rifle. The device—the object of these patents—is described in both patents in general form without any details and specifications, such as operational RF wavelength, antenna and unit design and characteristics, etc. The system of U.S. Pat. No. 3,400,393 containing parabolic reflector is bulky and not suitable for regular hunting. Also, continuously emitting RF transmitter (beacon) proposed in this Patent and Patent Application continuously consumes energy of battery that is not suitable for miniature device. Another idea generally proposed in the mentioned Patent and Patent Application is a reflector, RF or optical one, attached to a potential target. In this case, hunter's riffle is equipped with full transmitting/receiving unit working as a radio locator. Even though no details or specifications are given by the author about possible design of this system, simple analysis shows that such system can not properly works because of multiple reflections from objects in hunting area, which can not be separated from the response signal of the potential target.

Other attempts to utilize RF transponders to protect hunters are proposes in U.S. Pat. No. 4,833,452 and U.S. Pat. No. 5,307,053. These systems contain transponders which antennas has omnidirectional diagram. According to the patent, each hunter is equipped with such transponder, wherein each transponder sends RF signals to others that is in the area. Therefore, each hunter has information that a number of hunters is in this area. It gives them alert signal: "Be careful".

The systems proposed in the mentioned Patents provide just general information about existence of hunters equipped with the transponder in nearby area, but it does not specify position of each hunter, so such alert can confuse the hunter.

Another system proposed in U.S. Pat. No. 5,183,951 also comprises RF transceivers mounted on a rifle of each hunter who participates in the hunting. According to the author, these transceivers exchange signals so informing a hunter about presence of other hunters in the area. Despite of very general description of this device where the author mostly pays attention to device attachment on a rifle and does not provide any technical specification, it is obvious that such device is an omnidirectional one and can not provide information about position of each hunter, therefore this device is useless to really protect hunters from accidental shooting.

RF channel of IFF system described in U.S. patent application Ser. No. 12/557,574 comprises a rifle-mounted interrogator utilizing short-wavelength signal having narrow-diagram RF beam directed along the sightline.

It is known that the sharpness of the directional pattern of transmitter's RF antenna at given frequency is limited by antenna's aperture; and the antenna's aperture is limited by size and mass requirements for the application. Particularly, for a rifle-mounted device, the antenna's aperture has not to exceed 40×40 mm. Therefore, as calculations reveal, RF antenna with 40-mm aperture has relatively sharp (for RF radiation) transmitting/receiving directional pattern of about 13 arc degrees at 38 GHz RF wavelength and 20-arc-degrees directional pattern at 24 GHz frequency of 24 GHz. Such diagram allows recognizing a hunter situated in 22-meter area of shooting at the distance of 100 meter. Thus, the system provides information (and alert signal) about presence of "potential targets" in this area.

Also, all of mentioned system comprises a rifle-mounted interrogatory unit that in some cases is not convenient for hunters because it has to be mounted on the end of a barrel and requires special holders that have to be customized for rifles of different design. Another solution, the objects of the present invention, is a hat-mounted assembly comprising an interrogatory transceiver with relatively sharp directional pattern and one or more responding transceiver units covering 360 arc degrees in azimuth. This solution, the object of the present invention, allows creating such RF system that is independent from riffle design and can be used with any kind of rifles, arbalests or hunter's archer weapons. Also, another object of the present invention is flashlight-like RF interrogator that can be used in any situation to recognize objects equipped with said responding transceivers.

SUMMARY OF THE INVENTION

The present invention is dedicated and customized as a system preventing hunting accidents. It relates to the art described in U.S. patent application Ser. No. 13/031,703, U.S. patent application Ser. No. 12/465,715, U.S. Pat. No. 8,179,247 and Canadian Patent No 2,549,727 filed by the authors of the present invention.

The system can save lives especially in the situation when the sightline is shaded by foliage, trees, etc; and when hunter starts shooting in the direction of noise produced by hunted animal or in the direction of unidentified object.

The system provides two-way RF interrogator—transponder communication, wherein said interrogator operating with a single RF beam can be optionally mounted on hunter's rifle, hat, belt, or incorporated in a handhold hosting, such as flashlight case. Said transponder has multiple antennas or RF units attached to hunter's hat or belt in such a way that their directional patterns cover 360 arc degrees in azimuth.

All RF units can be based on Gunn Diode, hybrid or micro-chip technologies.

THE DRAWINGS

FIG. 1 illustrates operation of the system of the present invention.

Figure 2:
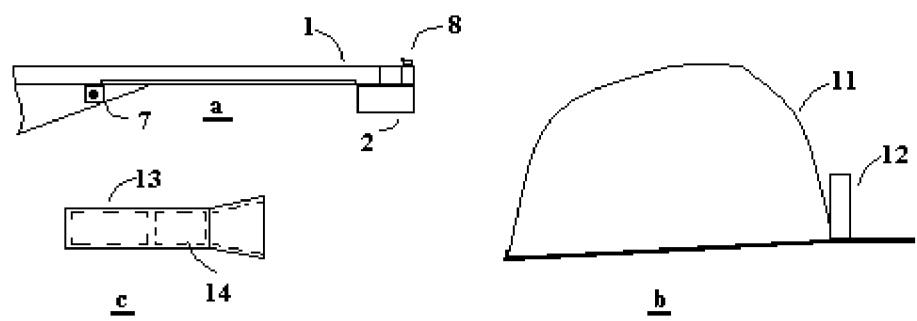
Figure 3:
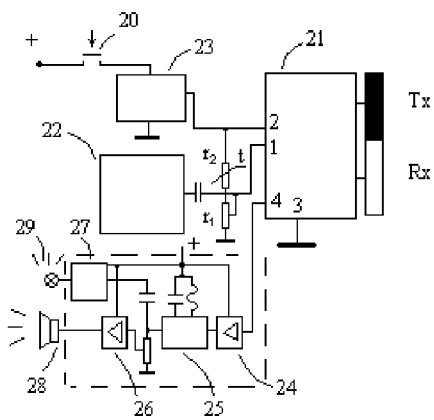
Figure 4:
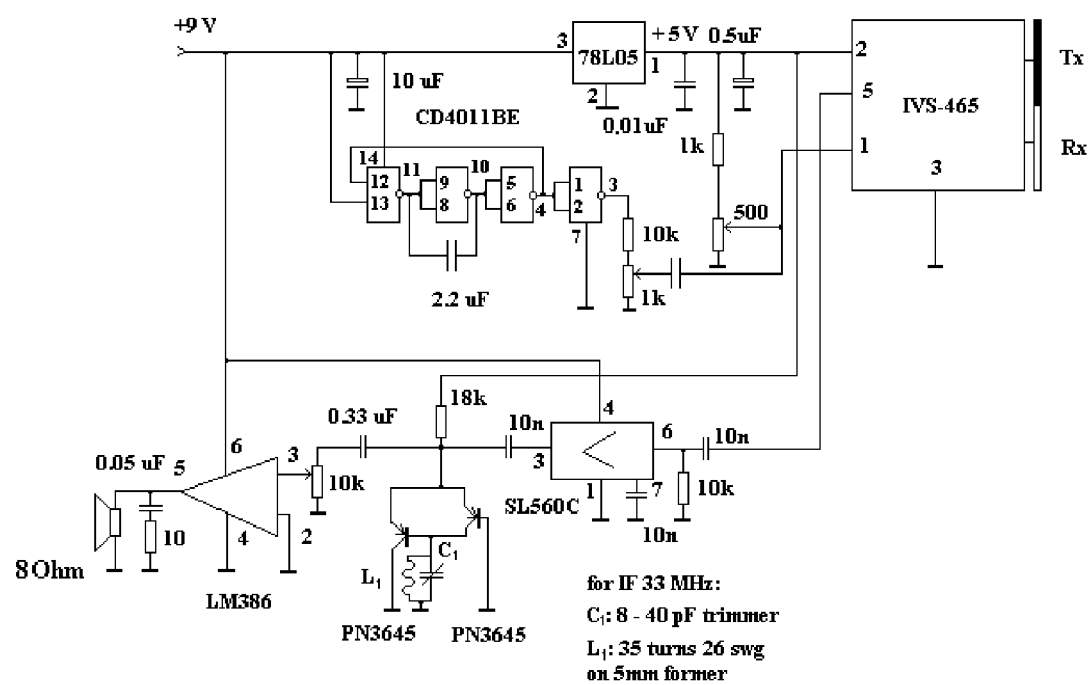
Figure 5:
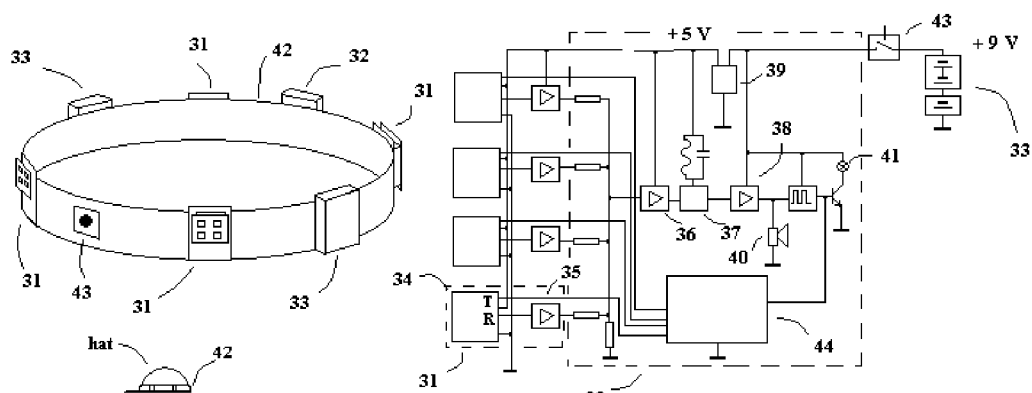
Figure 6:
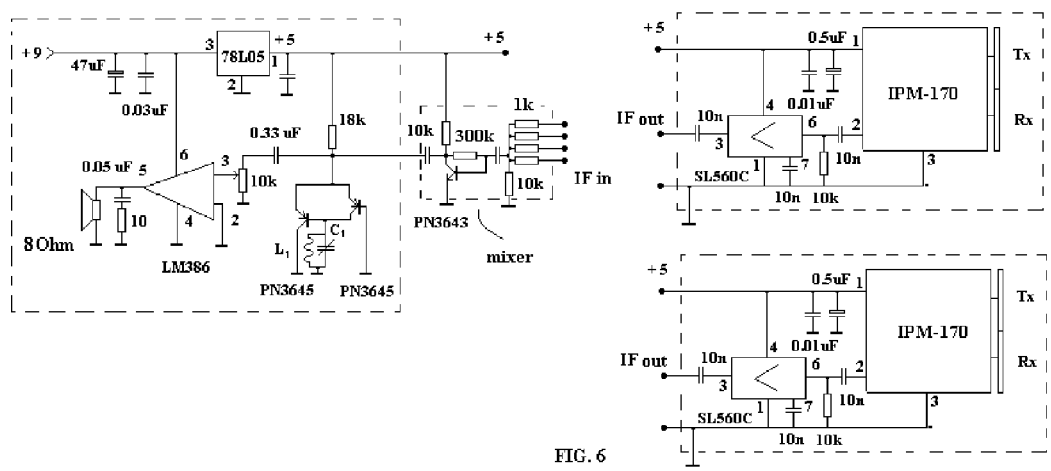
Figure 7:
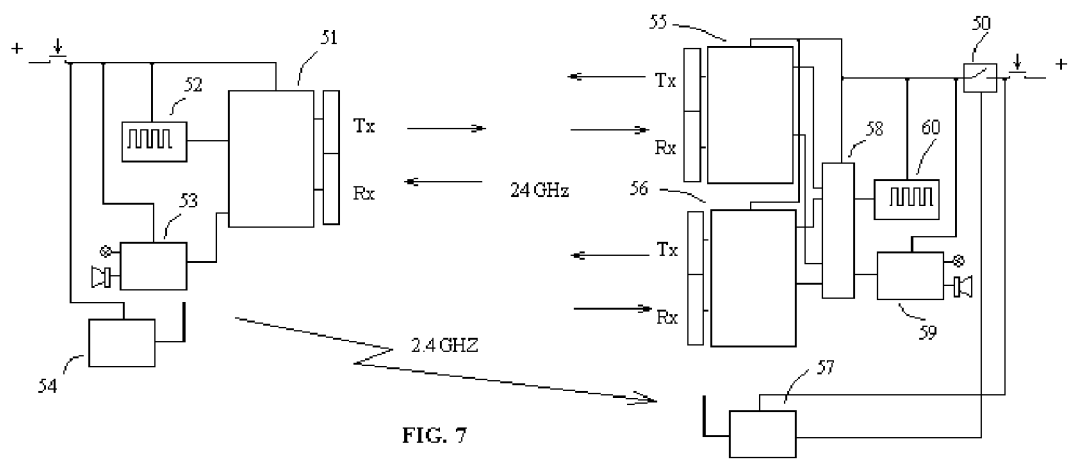
Figure 8:
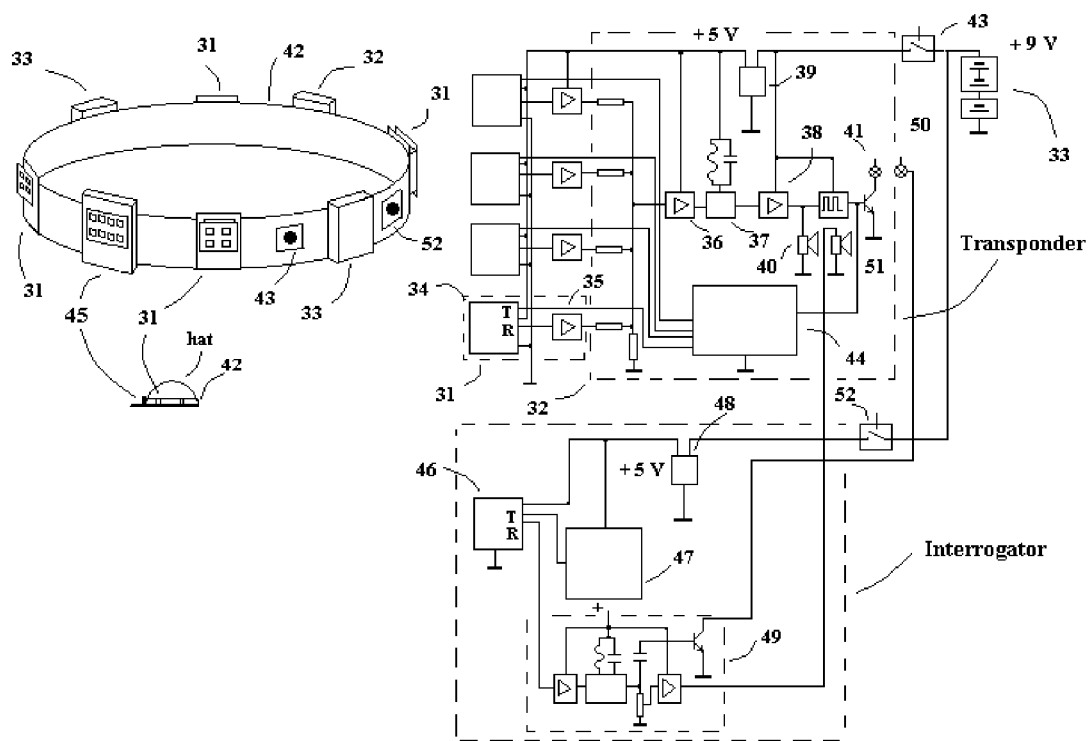
Figure 9:
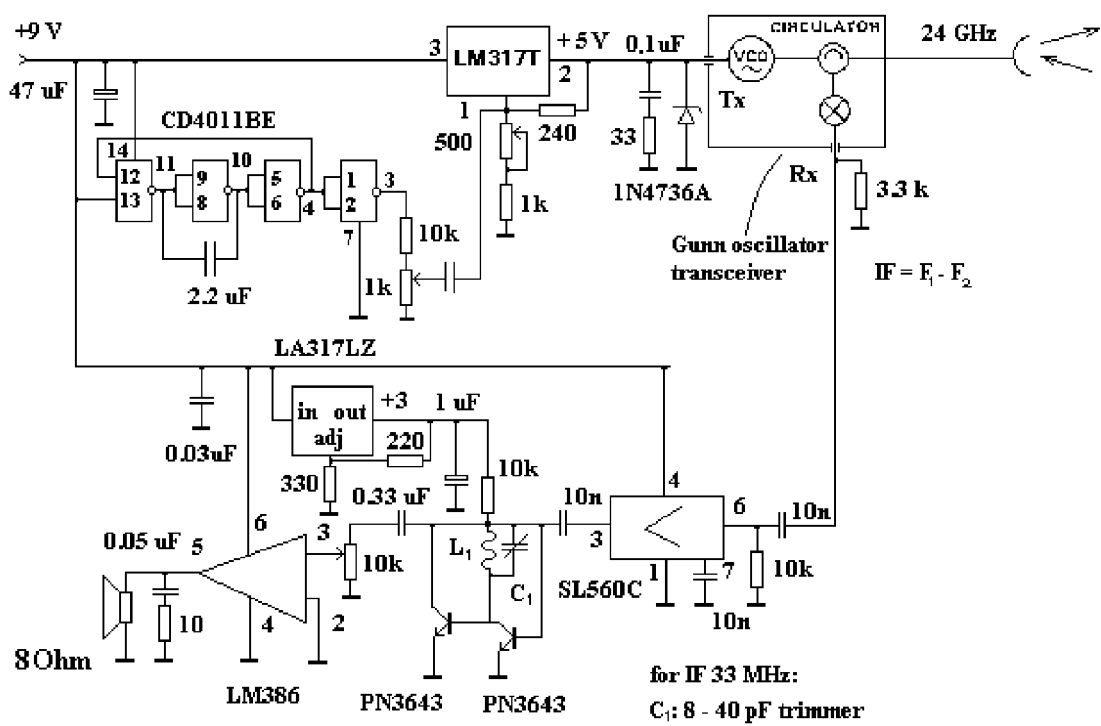

FIG. 2 depicts position of the interrogator on the rifle, hunter's hat, or on handhold hosting, FIG. 3 depicts the block-scheme of the interrogator, FIG. 4 depicts example of wire diagram of the interrogator, FIG. 5 depicts of possible design and block-scheme of the transponder, FIG. 6 depicts example of wire diagram of the transponder, FIG. 7 depicts the block-scheme of the system incorporating a low-frequency channel to activate the transponder, FIG. 8 depicts of possible design and block-scheme of the system, wherein the interrogator is attached to the hat, FIG. 9 depicts example of wire diagram of the interrogator based on Gunn Diode technology,

DETAILED DESCRIPTION OF THE PREFERRED EMBODIMENT OF THE INVENTION

RF System for Preventing Hunting Accidents with Rifle-Attached Interrogator and Transponder Attached to Hunter's Hat The schematic diagram of the prevention system of the present invention and its operation is depicted in FIG. 1.

The system for prevention of hunting accidents—the object of the present invention—generally includes a RF interrogatory (request) unit 2 attached to a hunter's rifle and a RF transponder (response unit) 3 attached to a hunter's hat 4 that sends RF response signal when it is activated by the request signal of the interrogator.

The interrogator and transponder of the preferred embodiment contain a RF channel transmitting request signal and a RF channel receiving response signal RF, wherein said channels operate in millimeter-wavelength K band (such as 24 GHz and up); and said interrogator and transponder contain one or more RF transceivers based on hybrid, micro-chip or Gunn Diode technologies. These K-band transceivers comprise a transmitter and a receiver connected to transmitting and receiving antennas.

In the preferred embodiment said interrogator is equipped with the single transceiver having two—transmitting and receiving—antennas that have sharp directional pattern (about 15-20 arc degrees); optionally it can utilize single antenna connected to the transmitter and receiver via RF circulator.

The transponder of the preferred embodiment, which, unlike the interrogator, requires omnidirectional diagram of RF antennas, utilizes a set of RF transceivers. Each of said RF transceivers contains hybrid or micro-chip transmitter and receiver and two wide-diagram antennas—transmitting and receiving ones. All said transceivers are attached to a hunter's hat in convenient place, or evenly attached to a band 3 surrounding said hunter's hat (see also FIG. 5) in such a way that its combined directional pattern covers 360 arc degrees in azimuth. Outputs of all said RF transceivers are connected to a single electronic unit via short cables and a combiner. The electronic unit together with a battery compartment is also attached to band 3; therefore all elements of the transponder are mounted on the single band 3.

Optionally, said transceivers, electronic unit and battery compartment can be attached in the same way to a belt surrounding hunter's waist.

The system operates as follows:

Said interrogator 2 sends a request signal.

The request signal is received by transponder 3 activating transmitter channels of the transponder, which send distinctive response signal. Simultaneously the signal activates alert sound signal telling the target "you may be under fire".

The response signal developed by the transponder is received by interrogator's receiver.

The received response signal activates alert light 4 and sound signals (not shown on FIG. 1) that tell shooter "not to shoot".

Because a hunter in hunting game can be a target too, the alert sound signals for the shooter and for the target have to be distinctively different, wherein the light signal is activated for the shooter only.

Therefore, all hunters and any person (also, it can be hunter's dog), who is in hunting area, can be equipped with said system, wherein persons other than hunters can be equipped by said transponder only.

Detailed Description of Interrogator of the Preferred Embodiment

Positions of the interrogator on a rifle, hunter's hat or on handhold hosting (other embodiments of the present invention) are depicted in FIG. 2. The interrogator of the preferred embodiment 2 is attached to rifle's barrel 1 (see FIG. 2*a*) that allows precisely directing the RF beam along rifle's sightline. To diminish distortion of antenna's directional pattern caused by rifle's barrel it is positioned on the end of the barrel. Activation button 7 is attached to the rifle in any convenient place; it is connected to the interrogator 2 via wire line. Optionally, the button 7 can be wireless one. The alert light signal 8 is attached to rifle's sight; it is connected to the interrogator 2 by short wire line too.

The interrogator of the present embodiment contains 24-GHz transceiver equipped Tx and Rx patch antennas, where 24-GHz frequency of this particular choice is the compromise between cost of the system and its features, such as beam directivity, size and weight. So, it can be any K-band frequency legal for outdoor application, such as 35 GHz and up, wherein the highest possible frequency of the signal of this system is limited by absorption of the signal in atmosphere, foliage and other objects, which increases with signal frequency. Example of block-scheme of the interrogator of the present embodiment is depicted in FIG. 3.

Transceiver 21 depicted in FIG. 3 has four connectors: connector 2—voltage, connector 3—ground, connector 1—FM input and connector 4—IF input. FM input (connector 1) is connected to electronic unit 22 that develops the request signal. In the simplest case, it can be just pulse generator developing tone signal. IF output (connector 4) is sequentially connected to LNA 24, FM decoder 25 and, further, to power amplifier 26 feeding a speaker (buzzer) 28 that sounds alert signal. Also, FM signal coming from FM decoder 25 activates switch 27 that is switching on alert light 29. Resistor $r_1$ tunes frequency of transceiver's oscillator; and thermo-resistor $r_2$ compensates frequency drift caused by ambient temperature variation.

The digital variant of the present embodiment comprises processing unit (not shown on FIG. 3) instead of power amplifier 26. In this case, said request signal contains digital code individual for each system that is developed by said processing unit. Also, said processing unit restores shapes of the digital signal decoded by FM decoder 25, process it and activates buzzer 28 and light 29. Optionally, it memorizes all sent and received coded signal together with time stamp.

As an example of implementation, the wire diagram of the interrogator of the present embodiment utilizing PCB with discrete elements, such as transistors and chips, is depicted in FIG. 4. Said interrogator has been developed and tested by the authors of the present invention. Here, single 24-GHz RF transceiver IVM-465 (from InnoSent GmbH) is used. It has two similar separated antennas—Tx and Rx ones, IF output and FM input that also is used for frequency tuning. The transceiver develops IF signal which frequency is equal to the difference between frequencies of oscillators of the transceivers of the interrogator and transceivers of the transponder. For the diagram shown on FIG. 4 this frequency is 30 MHz. Instead of pulse generator on CD4011 it can be any tone generator developing 3-5-KHz pulses. The FM demodulator—a super-regenerator FM detector—is built on PN3645 transistors. This scheme utilizes two chips—LNA SL560C and low-power acoustic amplifier LM386. Measured power consumption of said transceiver is about 46 mA at 9 VDC.

Also, this interrogator can be built using modern technology that allows significantly minimizing its size and weight.

Detailed Description of Transponder of the Preferred Embodiment

The scheme and block-diagram of the transponder are depicted in FIG. 5.

The transponder of the preferred embodiment comprises a number of miniature RF transceivers 31 positioned on a band 42 surrounding hunter's hat or helmet in such a way that allows total directional patterns of antennas of RF transceivers covering 360-arc degrees in azimuth.

Each RF unit 31 consists of 24-GHz RF transceiver 34 having IF output and FM input and LNA 35.

So, transceivers 34 receive 24-GHz FM request signal sent by the interrogator. IF signal from each transceiver 34 is amplified by LNA 35 and enters electronic unit 32 via multi-input combiner 36 incorporated in the unit 32. Further, the signal is demodulated by FM detector 37, amplified by amplifier 38, to which speaker (buzzer) 40 sounding alert signal is connected. The signal that exits amplifier 38 activates alert light 41 and, also, transmitting unit 44 that develops the response signal; said signal is transmitted back to the interrogator by the transmitters of the transceivers 31.

In the simplest case, the response signal can be simple distinctive tone signal; so, in this case, transmitting unit can be just a pulse generator. In this case, variation of volume of tone signal heard in speaker 40 (headphones) that is depend on power of received signal and caused by angular misalignment between sightline and hunter-target line, also, allows more accurately find position of the potential target. The experiments conducted by the authors of the present invention prove such feasibility.

Also, a digital variant (optional) of the transponder contains a processing unit instead of amplifier 38 that develops said request signal containing digital code individual for each system, processes received digital signal and activates buzzer 40 and light 41.

Transceivers 34 can operate all together. Optionally they can be serially switched on by a power switch (not shown on FIG. 5), wherein its outputs are sequentially connected to the input of electronic unit 32 via an electronic switch (not shown on FIG. 5) synchronized with said power switch, whereas electronic unit 32 operates continuously. In this case, power consumption of the transponder is significantly minimized. Also, especially in the digital variant, said processing unit synchronized with the electronic switch can recognize direction from which request signal comes so selecting the transceiver that receives the request signal; and the selected transceiver sends the response signal back to the recognized direction.

As an example of implementation, the variant of wire diagram of the receiver of the transponder of the present embodiment is depicted in FIG. 6 (two RF units are shown). 24-GHz transceivers IPM-170 (from InnoSent GmbH) are used in the transceiver, which are the similar to IVM-465 used in the interrogator, except absence of frequency tuning and antennas that here have wider directional pattern. The receiver of this embodiment utilizes the receiving unit similar to one shown on FIG. 4 that additionally has the combiner connecting outputs of number of RF units to input of the FM demodulator (transistors PN3645 on FIG. 6).

Transmitting part of the scheme can be similar to one shown on FIG. 4.

Also, this transponder can be built using modern microchip technology that can allow significantly minimizing its size and weight.

Description of Another Embodiment of the Invention

RF System for Preventing Hunting Accidents Having Additional L-Band Channel

The system of this embodiment incorporates additional simplex L-band or UHF channel, wherein interrogator, when it is activated, sends omnidirectional start-up signal that activates all nearby transponders. So, the interrogator and transponder of this embodiment additionally comprise a low-frequency simplex channel operating in L (such as 2.4 GHz, etc.) or UHF (such as 900 MHz, etc.) wavebands. The scheme of this embodiment is depicted in FIG. 7. Here, interrogator comprising RF unit 51, source of request signal 52, electronic unit 53, which are similar to ones of the preferable embodiment, additionally contains 2.4 GHz transmitter 54 that establishes said low-frequency channel. Transponder of this embodiment, which comprises one or more RF units 55, 56, source of response signal 60, electronic unit 59 similar to ones of the preferable embodiment, additionally contains 2.4 GHz receiver 57 that receives startup signal switching on said transponder by electronic switch 50. So, this additional channel triggered by button 61 sends startup RF signal that activate said transponder and keeps it operating for the short time that is enough for information exchanging between said interrogator and said transponder. The solution implemented in this particular embodiment allows significantly diminishing power consumption of the transponder. Also, such additional channel can provide to the transponder information about distance between shooter and target by means of measurement of the power of the request L-band signal that can be used to adjust power of the response 24-GHz RF signal so preventing interrogator's receiver from overloading; wherein such overloading distorts diagram of the receiving antenna so makes happen the interrogator to react on any reflected or scattered radiation coming from nearby objects.

Optionally, the system of this embodiment can comprise duplex L-band (UHF) omnidirectional channel, wherein the interrogator sends the request signal in both k-band and L-band (UHF) wavebands; and all nearby transceivers (that are situated in shooting distance) send response signal in L-band (UHF), whereas only transponder on which the rifle is aimed sends the response signal in K-band. Therefore, all nearby possible targets in the shooting area become acknowledged that somebody prepares to shoot. This information can be displayed by distinctive sigh, such as yellow light, etc. When the shooter receives the request signal from the potential target (in K-band), the system activates another distinctive signal, such as red light and sound, for example. Such additional information can be useful to figure out the situation in the shooting area so providing additional signal "be careful".

Description of Another Embodiment of the Invention

RF System for Preventing Hunting Accidents, Wherein the Interrogator and Transponder are Attached to Hunter'S Hat Interrogator of the system for prevention of hunting accidents of this embodiment operates similarly to a miner's flashlight; here a narrow RF beam illuminates some sector in front of a hunter. The interrogator of this embodiment is attached to the forehead of hunter's hat or helmet (see FIG. 2b) in such a way in which axis of the RF beam is aligned to the direction of vision of the hunter; so it is matched with a sightline of a rifle. Because position of the interrogator on a hat does not strictly restrict size of interrogator's antenna (unlike rifle-mounted one), its aperture can be increased up to 60 mm that allows shrinking the directional pattern to about 15 arc degrees.

The scheme and block-diagram of the transponder are depicted in FIG. 8.

Transponder of this embodiment is the similar to one of the preferred embodiment; and the interrogator, which is the similar to one of the preferred embodiment, is attached to the same belt (ribbon band) to which RF units are attached, wherein interrogator's and transponder's electronic units are combined in a single electronic unit. Therefore, all system is incorporated in a single unit attached to hunter's hat, wherein axis of directional pattern of the interrogator's antennas is aligned to the direction of vision of the hunter (axis of symmetry of the hunter's hat).

Description of Another Embodiment of the Invention

RF System for Preventing Hunting Accidents Having Interrogator Incorporated in Handhold Case Interrogator of the system for prevention of hunting accidents of this embodiment operates similarly to a flashlight; here a narrow RF beam illuminates some sector informing the shooter about presence of potential target here. In some cases it can be preferable because it allows independently recognize presents of another hunters or others that may be targeted by erratic fire. Tasks of such system are close to ones of Combat Identification and Alert systems (OCID), but this embodiment of the present invention is dedicated to civil application.

Transponder of this embodiment is the similar to one of the preferred embodiment (see FIG. 5, 6); and the interrogator is incorporated in handhold hosting, for example, similar to flashlight case (see FIG. 2c). In this embodiment, the interrogator can utilize different microwave technologies, such as Gunn Diode, hybrid or micro-chip ones.

As an example of the embodiment, the wire diagram of the interrogator utilizing Gunn Diode technology is depicted in FIG. 9. The scheme of the interrogator is generally similar to one depicted in FIG. 4, except transmitting channel that uses modulation of voltage feeding Gunn Diode oscillator for frequency modulation of transmitted signal. In some cases (for this embodiment) Gunn Diode interrogator may be preferable because of its durable rigid design and ability to incorporate a single transmitting/receiving horn antenna, etc. Unlike interrogators based on hybrid or chip technology, Gunn Diode interrogator has relatively high power consumption (about 120 mA at 9 VDC), but such disadvantage is not essential for this application because said interrogator operates only when power button of the interrogator is depressed;

so total power consumption will be low. This interrogator has been developed and tested by the authors of the present invention.

System Operation

The system operates as follows:

Interrogator (position 2 on FIG. 1) being activated by power-on button (position 7 on FIG. 2 and position 20 on FIG. 3) sends a request signal.

The request signal is received by transponder (position 3 on FIG. 1) so activating transmitter channels of said transponder, which send distinctive response signal. Simultaneously the signal activates alert sound signal telling the target "you may be under fire".

The response signal developed by said transponder is received be interrogator's receiver. The received response signal activates alert light (position 4 on FIG. 1) and sound signals (not shown on FIG. 1) that tell shooter "not to shoot".

When a number of hunters are involve in hunting game, it may be interference between response signals caused be reflection of the request signal and, also by responding neighbor systems. There are a few ways to eliminate such interference.

The simplest (analog) way to avoid possible interference between interrogator and transponder of the same unit is to tune frequencies of all oscillators of RF transceivers incorporated in the interrogator and transponder of each hunter's unit to equal. Therefore, frequency of IF signal coming from reflection from objects which occur in RF beam is equal to zero; so such signals are not registered by receivers of said system. In this case, frequency of oscillators of other hunter's units has to be shifted about each other and, therefore, FM demodulators have to be individually tuned on such IF frequencies. So, in this case FM demodulators of all hunter's units have to be multi-frequency ones, wherein each IF frequency belongs to each individual hunter.

There is another, more complicated analog way to avoid interference between interrogator and transponder of the same hunter's unit and between the units of other hunters. Here, oscillators of interrogator of all systems are tuned in the same frequency; and oscillators of transponder of all systems are tuned in the same frequency, but this frequency is shifted about the frequency of interrogator on some value, such as 30 MHz (for example, 24 GHz and 24.03 GHz). Frequency of FM modulation of request and response signals of the first system is, for example, 15 kHz; and frequency of FM modulation of request and response signals of other systems are shifted in 200 Hz (as an example) about each other. So, FM frequency of the second signal is 15.2 kHz, the third—15.4 kHz, the fourth—14.8 kHz, etc. Therefore, the receivers of the one particular system can receive reflected signal, but it is not hearable because human ear (and a speaker) is not sensitive to these frequencies, whereas the response signal coming from other systems becomes hearable because of beats between modulation frequencies. So, frequency of acoustic signal coming to that first system, for example, from second system will be 200 Hz. Because these frequencies are not matched with each other, each hunter will hear distinctive acoustic signal received from another hunter. The mentioned FM frequencies can be any ones, but situated above threshold frequency of human ear. This approach allows introducing large number of hunters equipped by such units without interferences between them.

Another (digital) way to avoid such interference is to utilize processor that develops coded digital signal of the interrogator, which is individual for each hunter, processes digital signal received from another hunter and develops response digital signal. In this case, oscillators of interrogator of all hunter's units are tuned in the same frequency; and oscillators of transponder of all hunter's units are tuned in the same frequency, but this frequency is shifted about the frequency of interrogator on some value similarly to the previous approach (30 MHz, for example). In this case hunter's units receive all codes, but each digital code is distinctive one and belongs to each individual hunter (his ID). This approach allows digitizing the system so introducing all features of digital processing and information displaying. For example, it allows memorizing all transmitted and received signals together with time stamp that could be essential in the case of investigation of hunting accidents.

What is claimed is:

1. A RF system for preventing hunting accidents comprising:
    an attached to a shooter interrogator, which comprises a millimeter-wavelength transceiver containing a transmitter that sends a request signal in an area to which sightline of said firearm is directed and a receiver which receives a response signal from said area to which sightline of said firearm is directed,
    an attached to a friendly target transponder, which receives said request signal emitted by said interrogator,
wherein the improvement comprises:
    said interrogator mounted on end of a barrel of a firearm equipped with a single sharp-diagram transmitting-receiving RF antenna, wherein said transmitter and said receiver are separated by a RF circulator, which comprises an electronic unit developing said RF request signal, demodulating said RF response signal and activating alert signs,
    said transponder comprising a number of miniature RF transceivers attached to hunter's hat or belt and evenly spaced around said hat or belt in horizontal plane, wherein each of them contains a receiver equipped with a single wide-diagram transmitting-receiving RF antenna that receives said RF request signal and transmits said RF response signal, wherein said transmitter and said receiver are separated by a RF circulator; and directional patterns of said antennas overlap each other so covering together 360-arc degree pattern in azimuth,
    transponder's electronic unit developing said RF response signal, demodulating said RF request signal and activating alert signs, wherein each of said miniature RF transceivers is equipped with said electronic unit.

2. The RF system of claim 1, wherein to reduce power consumption of the transponder and recognize direction from which the request signal comes, the miniature transceivers are serially switched on by a power switch, wherein all said miniature transceivers are sequentially connected to a single transponder's electronic unit via an electronic switch synchronized with said power switch, whereas said electronic unit operates continuously.

3. The RF system of claim 1 comprising the interrogator and the transceiver, wherein said interrogator is attached to forehead of the hunter's hat or helmet; and said interrogator's and transponder's electronic units are combined in a single electronic unit attached to the hunter's hat or helmet.

4. The RF system of claim 1 comprising the interrogator and the transceiver, wherein said interrogator is mounted in separate handhold hosting that can be aimed to a place where potential targets may be situated; so said system gives information about said potential targets in said area.

5. The RF system of claim 1 comprising the interrogator and the transceiver, which to minimize power consumption, additionally incorporate simplex L-band or UHF channel, wherein, the interrogator equipped with said L-band or UHF channel sends omnidirectional start-up signal that activates all nearby transponders equipped with said L-band or UHF channel; so these transponders activated by said signal become switched on in waiting mode on some period of time that is enough to exchange information between said interrogator and said transponder.

6. The RF system of claim 1 comprising the interrogator and the transceiver, wherein RF request signal sent by said interrogator is modulated by acoustic frequency signal that is further demodulated by the electronic unit of said transponder and used as an acoustic alert signal and, also, to activate the response signal and inform a potential target that it can be under fire; and RF response signal sent by said transponder is, also, modulated by acoustic frequency signal that is demodulated by the electronic unit of said interrogator and used as an acoustic alert signal telling to a shooter "not to shoot".

7. The RF system of claim 1 comprising the interrogator and the transceiver, wherein, to eliminate possible interference between received response signal and reflected signal, the request signal sent by said interrogator is modulated by an acoustic frequency exceeding threshold frequency of human ear; so said reflected signal received by said interrogator becomes not hearable.

8. The RF system of claim 7, wherein, to distinctively separate response signals coming from other systems, said frequencies of modulation of the different systems involved in a hunting game are shifted about each other on small values; so beating of frequencies of two systems becomes hearable for human ear, whereas reflected signal still not hearable.

\* \* \* \* \*